United States Patent
Gopi et al.

(10) Patent No.: US 10,380,334 B2
(45) Date of Patent: Aug. 13, 2019

(54) DATA ACCESS RULES IN A DATABASE LAYER

(71) Applicant: SAP SE, Walldorf (DE)

(72) Inventors: Ajalesh P. Gopi, Bangalore (IN); Tenzin Choegyen, Bangalore (IN); Santosh V, Bangalore (IN); Sharath Jois, Bangalore (IN); Axel Herbst, Eppingen (DE)

(73) Assignee: SAP SE, Walldorf (DE)

( * ) Notice: Subject to any disclaimer, the term of this patent is extended or adjusted under 35 U.S.C. 154(b) by 412 days.

(21) Appl. No.: 14/934,629

(22) Filed: Nov. 6, 2015

(65) Prior Publication Data
US 2017/0132401 A1 May 11, 2017

(51) Int. Cl.
G06F 17/30 (2006.01)
G06F 7/00 (2006.01)
G06F 21/34 (2013.01)
G06F 21/62 (2013.01)

(52) U.S. Cl.
CPC .......... G06F 21/34 (2013.01); G06F 21/6218 (2013.01); G06F 2221/2141 (2013.01)

(58) Field of Classification Search
CPC ................ G06F 21/34; G06F 21/6218; G06F 2221/2141
USPC ........................................................ 707/786
See application file for complete search history.

(56) References Cited

U.S. PATENT DOCUMENTS

| | | | | |
|---|---|---|---|---|
| 6,336,114 B1* | 1/2002 | Garrison | ............. | G06F 21/6218 707/999.009 |
| 6,839,716 B1* | 1/2005 | Della-Libera | ......... | G06F 16/258 707/E17.006 |
| 7,356,840 B1* | 4/2008 | Bedell | ................. | G06F 21/6227 726/13 |
| 8,234,477 B2* | 7/2012 | Shaath | ................ | G06F 12/1466 711/163 |
| 8,397,026 B2* | 3/2013 | Wynne | ................ | G06F 21/6218 707/785 |
| 8,805,951 B1* | 8/2014 | Faibish | ................. | G06F 9/5072 709/213 |
| 9,083,557 B2* | 7/2015 | Bansal | .................... | H04L 51/12 |
| 9,390,285 B1* | 7/2016 | Dolas | ...................... | G06F 16/21 |
| 9,639,570 B2* | 5/2017 | Wright | ................ | G06F 16/9024 |
| 2002/0059236 A1* | 5/2002 | Satoh | .................. | G06F 21/6218 707/999.009 |

(Continued)

Primary Examiner — Pavan Mamillapalli
(74) Attorney, Agent, or Firm — Schwegman Lundberg & Woessner, P.A.

(57) ABSTRACT

The user of an application may query a data storage system with a request to access a dataset from a database of the system. The system identifies at least one data access rule that is applicable to the dataset, with the at least one data access rule specifying at least one user group authorized to access a restricted portion of the dataset. The system identifies an authorized access group associated with the application user and compares it to the at least one user group authorized to access the restricted portion of the dataset. If the authorized access group associated with the user does not match one of the at least one user group authorized to access the restricted portion of the dataset, the system assembles a modified dataset based on the dataset and the at least one data access rule and transmits the modified dataset to the application.

20 Claims, 8 Drawing Sheets

(56) References Cited

U.S. PATENT DOCUMENTS

| | | | | |
|---|---|---|---|---|
| 2004/0210581 | A1* | 10/2004 | Schwartz | G06F 16/25 |
| | | | | 707/999.009 |
| 2006/0230043 | A1* | 10/2006 | Sumner-Moore | ............... |
| | | | | G06F 21/6218 |
| | | | | 707/999.009 |
| 2007/0055658 | A1* | 3/2007 | Hsiao | G06F 16/24534 |
| 2008/0004886 | A1* | 1/2008 | Hames | G06F 21/10 |
| | | | | 705/26.1 |
| 2011/0302180 | A1* | 12/2011 | Muller | G06F 17/30424 |
| | | | | 707/754 |
| 2012/0240220 | A1* | 9/2012 | Smith | G06F 21/34 |
| | | | | 726/17 |
| 2012/0324529 | A1* | 12/2012 | Rangachari | G06F 21/604 |
| | | | | 726/1 |
| 2014/0298471 | A1* | 10/2014 | Feng | H04L 63/10 |
| | | | | 726/25 |
| 2016/0063271 | A1* | 3/2016 | Bartlett | G06F 16/13 |
| | | | | 726/28 |

* cited by examiner

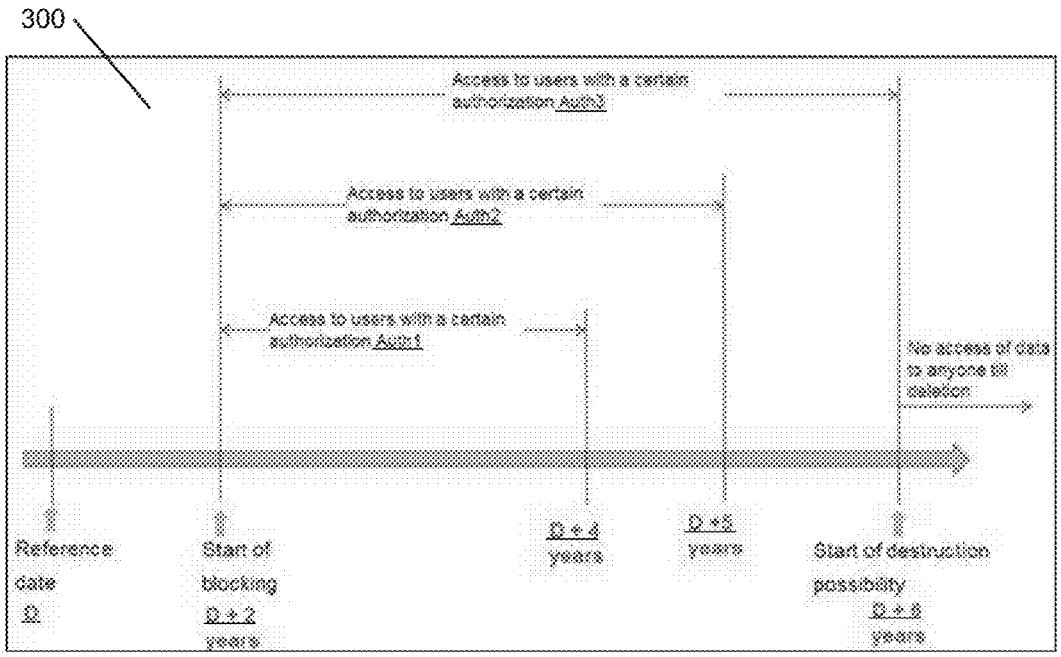

FIG. 3A

| Condition fields | | | Time reference column | End duration | | Auth Group | Action |
|---|---|---|---|---|---|---|---|
| CF1 | CF2 | CF3 | | Value | Unit | | |
| C1 | C2 | C3 | Ref. Date | 2 | Years | | Allow Access |
| C1 | C2 | C3 | Ref. Date | 4 | Years | AuthG1 | Block |
| C1 | C2 | C3 | Ref. Date | 5 | Years | AuthG2 | Block |
| C1 | C2 | C3 | Ref. Date | 6 | Years | AuthG3 | Block |

FIG. 3B

| Condition fields | | | Time reference column | End duration | | Auth Group | Action |
|---|---|---|---|---|---|---|---|
| Company Code | Fiscal Year | Document Type | | Value | Unit | | |
| 0001 | 2010 | Sales Order | Posting Date | 2 | Years | | Allow Access |
| 0001 | 2010 | Sales Order | Posting Date | 4 | Years | AuthG1 | Block |
| 0001 | 2010 | Sales Order | Posting Date | 5 | Years | AuthG2 | Block |
| 0001 | 2010 | Sales Order | Posting Date | 6 | Years | AuthG3 | Block |

FIG. 3C

DATA ACCESS RULES IN A DATABASE LAYER

TECHNICAL FIELD

The present disclosure relates generally to the implementation of data access rules in a database layer of a multi-layer application program. In an example embodiment, the modification of database access results in removing certain restricted data according to a data access rule to reduce, ideally minimize, data transfer and minimize processing in the application layer.

BACKGROUND

Controlling access to data is important in any data processing environment. For example, some data may be accessible only to users and/or applications with specific attributes or identifiers. According to another example, some data may be available to a certain group of users or applications during a defined period but not thereafter. In some cases only a portion of a dataset may be visible to one user whereas a different portion of the same dataset may be visible to another user. Data processing environments generally attempt to control access to restricted data via a rule that is enforced only when certain conditions are satisfied. Such rules are often implemented in a part of the data processing environment that does not store the data directly.

In this regard, many database-driven application programs contain three layers of programming—a user interface layer, an application layer, and a database layer. The application layer is generally responsible for selecting a set of data from the database layer, assembling the set of data and providing it for viewing and user interaction in the user interface layer. Therefore rules for controlling access to restricted data are generally implemented in the application layer. For example, in one common configuration, the data access rules are created, managed, and administered by a data access manager application. An application calls the data access manager application to receive a data access rule applicable to the data that is being requested in a query. The application then receives and applies the data access rule to the requested data.

BRIEF DESCRIPTION OF DRAWINGS

The present disclosure is illustrated by way of example and not limitation in the figures of the accompanying drawings, in which like references indicate similar elements and in which:

FIG. 3A is a diagram of a timeline illustrating a set of data access rules, consistent with some embodiments, for blocking access to restricted data.

FIGS. 3B and 3C are example data access rules, consistent with some embodiments, in the form of database tables.

DETAILED DESCRIPTION

Figure 1:
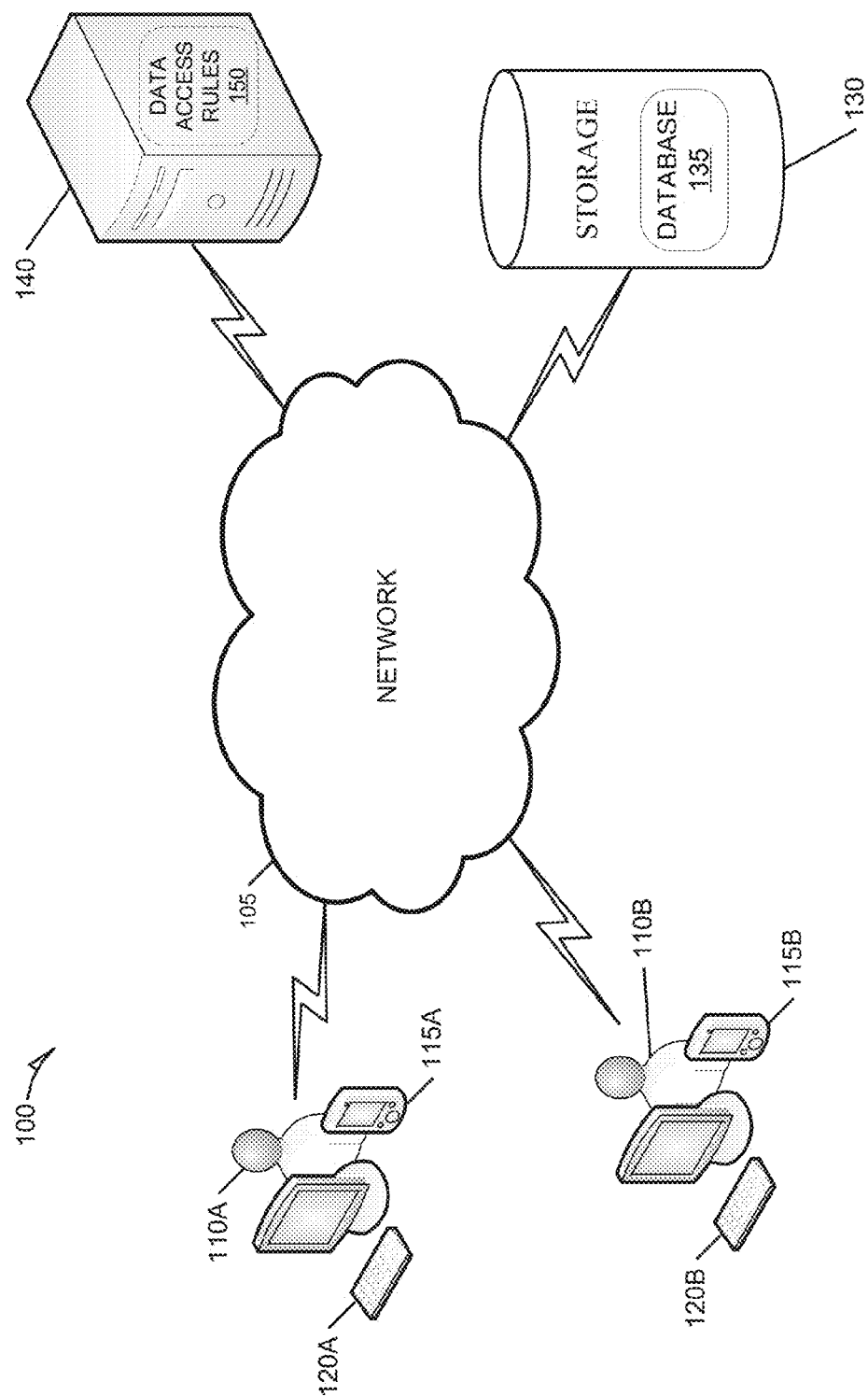
FIG. 1 is a use-case diagram showing a system, consistent with some embodiments, configured to process database queries over a network according to data access rules.

A software application created for any industry (be it Sales and Distribution or Material Management), will have data and data processing at its core. Such applications interact with databases for accessing, using, and manipulating data stored in the databases. In order to access data from the databases, the application transmits a query to the database and the database responds with a dataset. In such a data processing environment (e.g., application queries database that responds with dataset), the data being transferred may be subject to certain data access rules. For example, a user (e.g., auditor) may query for information about a group of sales made by a company during a specified time period. A database, such as a financial database, may return a dataset that includes information about sales orders with a posting date during the specified time period. However, a data access rule may be applicable to the dataset returned by the financial database. The data access rule may provide that a group of users, that includes the particular user associated with the query, be given access to only sales order data for sales orders with a posting date that is not older than a specified date. Therefore, the sales order dataset returned by the database in response to the query may have to be filtered, altered, or otherwise modified to comply with the data access rule before the dataset is transmitted to the user.

The implementation of the data access rules in the application layer results in the data access rules being applied to database transactions in a computationally inefficient manner. When query and response occur between an application and a database, the database simply generates the dataset that satisfies the query. The dataset is then transmitted to the application layer (e.g., application logic for comparing the dataset to rules) where it is subjected to restrictions, reduction, or other manipulations based on a comparison of the dataset to the data access rule. In such an operation, the database will often produce a larger dataset than can be ultimately provided in response to the query while complying with the data access rule. Producing a larger dataset causes a larger than needed amount of data to be retrieved from the database, transmitted for data access rule administration, and then to be computationally reduced. Furthermore, implementation of the data access rules in the application layer leaves data susceptible to security breach. Transmitting the larger dataset exposes the restricted data during transmission from the database to the application that ultimately applies the data access rule to the dataset. Furthermore, since many applications may be using the same data from the dataset it is prudent to apply any applicable data access rules to the dataset as early as possible in the query-response process. This is because the lower the layer (e.g., database layer) in which the data access rule is enforced is, the less risk there is of not applying a data access rule in any of the applications at higher layers (e.g., application layers). Therefore, the implementation of the data access rules in the application layer will often result in inefficient and unsafe database interactions. The subject matter disclosed herein provides a method, computer-usable program product, and data processing system for applying the data access rules in the database layer.

An embodiment of the data processing system for applying the data access rules in the database layer receives a query from an application to access a dataset in a database. The system then identifies at least one data access rule in the database layer (e.g., a table in the database) that is applicable to the requested dataset, with the at least one data access rule specifying at least one group authorized to access a restricted portion of the requested dataset. The system also identifies an authorized access group with which the application (or a user of the application) is associated and compares it to the at least one group authorized to access the restricted portion of the requested dataset. If the authorized access group associated with the user does not match one of the at least one user group authorized to access the restricted portion of the requested dataset, the system assembles (in the database layer) a modified requested dataset based on complying with the at least one data access rule and transmits the modified dataset to the application layer.

An embodiment provides for data access rules that describe conditions under which certain restricted data may be accessed. For example, a condition could be based on the value of data stored in a particular location (e.g., value: "sales order" stored at location: "document type") or a combination of values of data stored in particular locations (e.g., document type and a company code values). A condition may also be a logical computation capable of producing a Boolean result or capable of identifying data in a database. For example, a condition for a sales order data access rule may be "where posting date is prior to Jan. 1, 2005", and may result in a dataset with records that exclude sales orders with a posting date prior to "Jan. 1, 2005."

Embodiments may be implemented with respect to any type of data processing system. For example, an embodiment may be implemented in an object-oriented database, an XML database, or a hybrid database. Embodiments may be implemented in any type of client-server system, middleware system, file system, or a combination of these systems.

FIG. 1 is a use-case diagram showing a system 100, consistent with some embodiments, configured to process database queries over a network according to data access rules in the database layer. System 100 includes a network 105 that can be any medium used to provide communications links between various devices (e.g., storage) and computers connected together within the system 100. Network 105 may include connections, such as wired, wireless communication links, or fiber optic cables, etc. In the depicted example, network 105 may include the Internet. Of course, network 105 may also be implemented as a number of different types of networks, such as for example, an intranet, a local area network (LAN), or a wide area network (WAN). A server 140 is connected to network 105 along with a storage 130. In addition, client devices 115A, 115B, 120A and 120B of users 110A and 110B are also connected to network 105. Client devices 120A and 120B may be, for example, personal computers or network computers. Client devices 115A, 115B may be, for example, mobile computers or smart phones.

Server 140 may act as an intermediary between applications running on a client device (e.g., 120A) that request access to data in storage 130. Server 140 (or another server connected to network 105) may include data access rules 150 for regulating access to storage 130 by client devices. Although the data access rules 150 are shown as being included in server 140, according to the subject matter disclosed herein, these data access rules 150 may be provided in the database layer (e.g., as tables in database 135) in order to more efficiently transfer data across system 100. Storage 130 may include a database 135. Client device 120A, for example, may include an application (e.g., business application) that queries database 135 for data. As noted above, server 140 may facilitate (via an intermediary communication application) data communication between applications of client devices and databases of storage 130, in system 100. Database 135 may be any type of database or data repository as explained more fully below. The data access rules 150 may be an application configured to create, manipulate, or administer rules for data access in system 100. System 100 may include additional servers, clients, and other devices that are not shown.

System 100 may be used for implementing a client-server environment in which described embodiments may be implemented. A client-server environment enables software applications and data to be distributed across a network such that an application functions by using the interactivity between a client data processing system and a server data processing system. In this regard, an application running on client device 120A would normally query the database 135 and get a dataset in return. The application then stores the dataset in the application code in the form of temporary internal tables. After that the data access rules 150 that are applicable to the returned dataset are retrieved from server 140. Then, the data in the temporary internal tables are compared one by one with the retrieved data access rules 150 and the data which do not comply with the rules 150 are filtered out. Finally only the data which are compliant with the rules 150 are shown to the user 110A via a user interface of client device 120A.

However, according to an embodiment of system 100 for applying the data access rules 150 in the database layer, database 135 receives a query (e.g., via server 140) from an application running on client device 120A to access a dataset in database 135. The system 100 (e.g., via a calculation engine in database 135) then identifies at least one data access rule 150 in the database layer (e.g., a table in the database 135) that is applicable to the requested dataset. The at least one data access rule 150 specifies at least one group of users (or applications) authorized to access a restricted portion of the requested dataset. The system 100 also identifies an authorized access group with which the user 110A of client device 120A (or the application) is associated and compares it to the at least one group of users authorized to access the restricted portion of the requested dataset. If the authorized access group associated with the user 110A does not match one of the at least one user group authorized to access the restricted portion of the requested dataset, the system 100 assembles (in the database layer) a modified requested dataset based on filtering out data that does not comply with the at least one data access rule 150 and transmits the modified dataset to the application layer (e.g., application running on client device 120A).

Figure 2A:
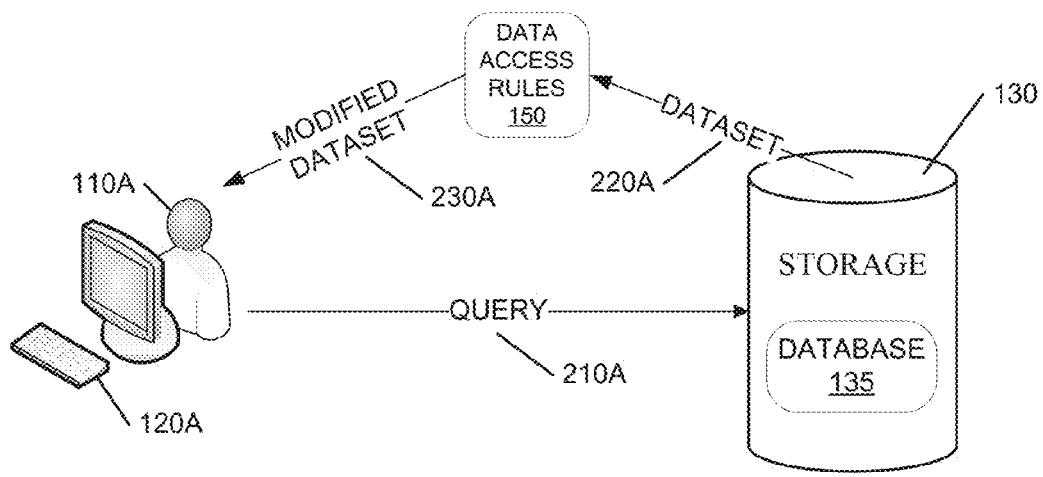
FIGS. 2A and 2B are use-case diagrams of data flows for processing database queries over a network according to data access rules.
Figure 2B:
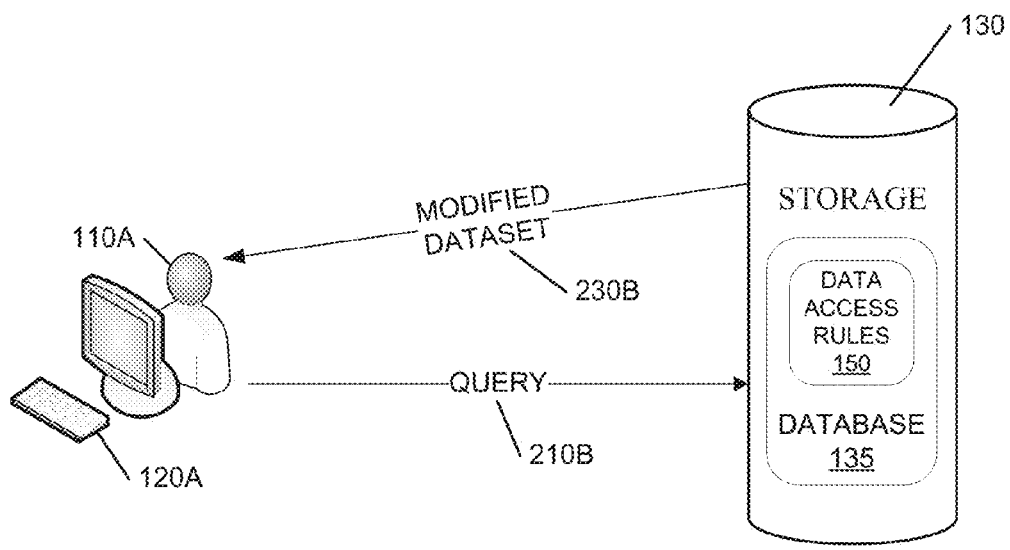

FIGS. 2A and 2B are use-case diagrams of data flows for processing database queries over a network according to data access rules. The elements in FIGS. 2A and 2B are elements from system 100 in FIG. 1 and are labeled with the same identifiers. The data transfers occur over a network like network 105 of FIG. 1, as explained above.

As shown in FIG. 2A, user 110A of client device 120A sends query 210A (e.g., via an application running on client device 120A) to database 135 of storage 130. Database 135 generates dataset 220A that satisfies the request for data in query 210A. Dataset 220A is transmitted to (or intercepted by) data access rules 150, which may comprise an application in a server like server 140 of FIG. 1, as explained above. The data access rules 150 can manipulate dataset 220A such that no data in dataset 220A that is not compliant with a data access rule 150 that is applicable to dataset 220A requested in query 210A is sent to user 110A of client device 120A. The data access rules 150 create a modified (e.g., reduced) dataset 230A according to the applicable data access rules 150 and then transmit the modified dataset 230A to user 110A of client device 120A.

As noted above, the data flow shown in FIG. 2A is inefficient and unsafe because dataset 220A may include data that must be removed by data access rules 150 and, prior to removal, such data has to be computed or retrieved at database 135 and transmitted to data access rules 150 (e.g., at server 140), perhaps over a data network like network 105 of FIG. 1, as explained above. Therefore, the data access rules 150 then expend computing resources to reduce dataset 220A to a modified dataset 230A. Therefore, the configuration of FIG. 2A is computationally intensive and may expose dataset 220A to a breach of security. Furthermore, such a configuration may also be expensive in computing time, use of bandwidth for data transfers, and other computing resources.

Figure 4:
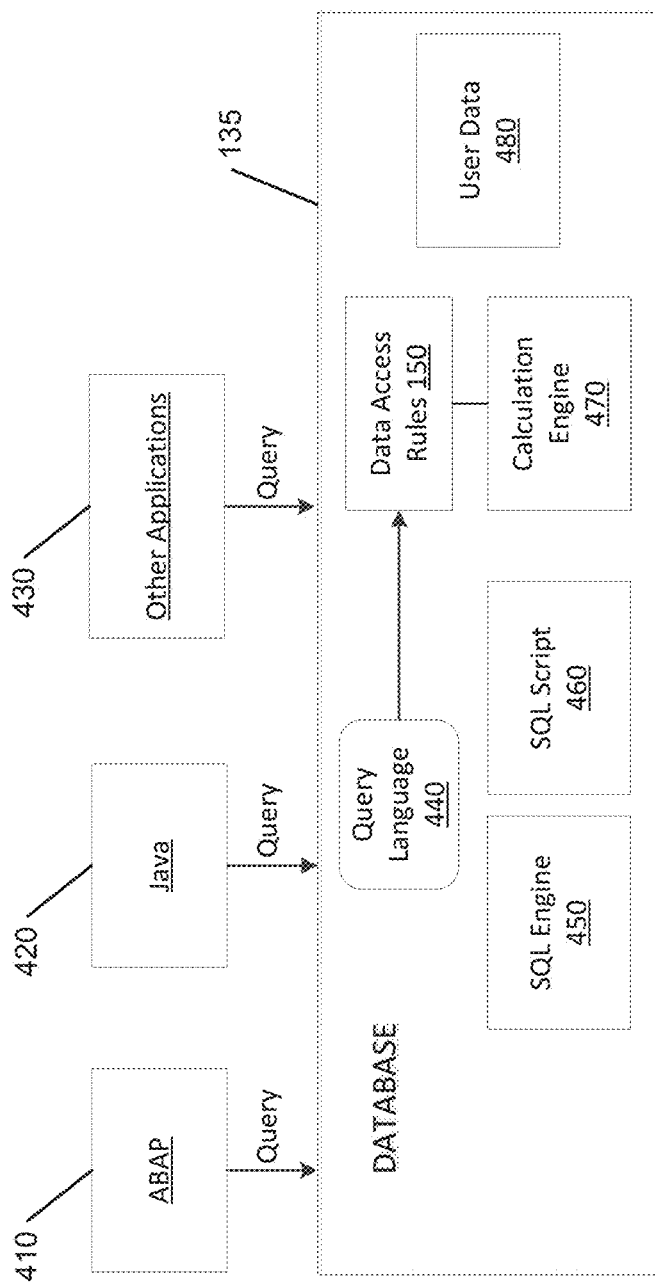
FIG. 4 is a block diagram of a database system, consistent with some embodiments, configured to process database queries over a network according to data access rules.

As shown in FIG. 2B, the data access rules 150 have been moved to the database layer into database 135 in accordance with an embodiment. Storage 130 may receive query 210B directed to database 135 from user 110A of client device 120A. Database 135 also accesses data access rule information, such as from data access rules 150 included in database 135. The data access rules 150 may comprise tables in database 135 as illustrated, for example, in FIG. 3C. The data access rules 150 correlate the contents of query 210B (e.g., what dataset is being requested) with a set of rules for data access and select one or more rules that may be applicable to query 210B. For example, if query 210B pertains to employee data, a data access rule 150 pertaining to distribution of employee data may be applicable to the dataset requested by query 210B. As another example, if query 210B has an identifier identifying the originator of query 210B (e.g., user 110A), the restricted employee data might still be accessed based on the data access rule 150 in question specifying that requests to access the restricted data are authorized by various users and/or user groups, such as a group including users 110A and 110B. The correlation of data access rules 150 to queries is likely to be implementation-specific (e.g., Java) and may vary between implementations as illustrated in FIG. 4.

The data access rules 150 identify at least one data access rule 150 that is applicable to the requested dataset of query 210B. The at least one data access rule 150 specifies at least one group of users (or applications) authorized to access a restricted portion of the requested dataset of query 210B. The data access rules 150 also identify (e.g., based on an identifier in query 210B) an authorized access group with which the user 110A of client device 120A (or the application) is associated and compares it to the at least one group of users authorized to access the restricted portion of the requested dataset of query 210B. If the authorized access group associated with the user 110A does not match one of the at least one user group authorized to access the restricted portion of the requested dataset of query 210B, the database 135 assembles (in the database layer) a modified dataset 230B based on filtering out data that does not comply with the at least one data access rule 150 from the requested dataset of query 210B and transmits the modified dataset 230B to the application layer (e.g., application running on client device 120A).

FIG. 3A is a diagram 300 of a timeline illustrating a set of data access rules 150, consistent with some embodiments, for blocking access to restricted data. The data access rules 150 specify conditions for accessing the restricted data according to user affiliation with authorization groups (e.g., Auth1, Auth2 and Auth3). In the example of FIG. 3A, a certain date D is the reference date and specified time periods for blocking access to certain restricted data (e.g., D+2, D+4, D+5 and D+6) are based on this date. A business application (e.g., running on client device 120A) generates data that is stored in a database (e.g., database 135) in the form of different database tables. As the data gets older, depending on the nature of the industry, there may be a need for the access to the data to be restricted to only a certain set of people who are privileged to see the data (e g , management) while being blocked for certain other users (e.g., anyone else). For example, if certain business records must be kept for 6 years (e.g., D+6), then it is helpful to limit access to these records after the 6 year time period has passed in order to limit any kind of liability that may result from the information in these older records. This is especially true if the business in question does not regularly purge old data, thus allowing unneeded data (e.g., not required to be stored) to persist for too long.

FIGS. 3B and 3C are example data access rules 150, consistent with some embodiments, in the form of database tables.

In FIG. 3B, a data access rule 150 comprises an example database table 310 that specifies conditions for accessing the restricted data according to user affiliation with different authorization groups (e.g., AuthG1, AuthG2 and AuthG3). In the example of FIG. 3B, the database table 310 lists several condition fields (CF1, CF2 and CF3) and requested data must meet these listed conditions in order for the data access rule 150 represented by database table 310 to be applicable to the requested data. Furthermore, the database table 310 includes a time reference column for a reference date (Ref. Date, like reference data D of FIG. 3A) and an end duration for time periods (e.g., measured from the Ref. Date) after which access to the data is further limited. Therefore, according to the data access rule 150 represented by database table 310, if any requested data meets the listed conditions CF1, CF2 and CF3, this data will be available for access (e.g., "Allow Access") to all the users until "Ref. Date+2 years".

However, after two years, access to the data is restricted (e.g., "Block") so that only users affiliated with the following authorization groups can access the data: AuthG1, AuthG2 and AuthG3. Then, during the time period between 4 and 5 years from the Ref. Date, only users affiliated with the following authorization groups can access the data: AuthG2 and AuthG3. Then, during the time period between 4 and 5 years from the Ref. Date, only users affiliated with the following authorization groups can access the data: AuthG3. Finally, after 6 years from the Ref. Date, no user can access the data. At this point, a running background process may detect such "old" data and might take specified system clean-up actions, such as automatic destruction (of records) or wiping out (field values) of the "old" data.

In FIG. 3C, a data access rule 150 comprises an example database table 320 that specifies conditions for accessing restricted "sales order" data according to user affiliation with different authorization groups (e.g., AuthG1, AuthG2 and AuthG3). In the example of FIG. 3C, the database table 320 lists several condition fields: "Company Code" to identify a business that produced the sales order, "Fiscal Year" to identify the year in which the sales order was posted, and "Document Type" to identify the data as a sales order document. Any requested data must meet these listed conditions in order for the data access rule 150 represented by database table 320 to be applicable to the requested data. Furthermore, the database table 320 includes a time reference column for a reference date (e.g., "Posting Date") and an end duration for time periods (e.g., measured from the posting date) after which access to the data is further limited. Therefore, according to the data access rule 150 represented by database table 320, if any requested data meets the listed "Company Code=0001", "Fiscal Year=2010" and "Document Type=Sales Order" conditions, this data will be available for access (e.g., "Allow Access") to all the users until "Posting Date+2 years".

However, after two years, access to the data is restricted (e.g., "Block") so that only users affiliated with the following authorization groups can access the data: AuthG1, AuthG2 and AuthG3. Then, during the time period between 4 and 5 years from the posting date, only users affiliated with the following authorization groups can access the data: AuthG2 and AuthG3. Then, during the time period between 4 and 5 years from the posting date, only users affiliated with the following authorization groups can access the data: AuthG3. Finally, after 6 years from the posting date, no user can access the data.

FIG. 4 is a block diagram of a database system, consistent with some embodiments, configured to process database queries over a network according to data access rules. Database 135 is a relational database with an SQL engine 450 and SQL script 460. Database 135 (e.g., the database layer) receives a query (e.g., via server 140) from an application (e.g., ABAP application 410, Java application 420 or other applications 430 of the application layers) running on a client device (e.g., client device 120A) to access a dataset in database 135. The database query language 440 will initially process the query and check with the rule framework (e.g., data access rules 150 and calculation engine 470) whether there are any rules existing for restricting access to the requested dataset. The database 135, via calculation engine 470, identifies at least one data access rule 150 that is applicable to the requested dataset based on table functions and parameters stored in data access rules 150. The at least one data access rule 150 specifies at least one group of users (or applications) authorized to access a restricted portion of the requested dataset. The database 135 also identifies an authorized access group with which the querying user (e.g., 110A of client device 120A) is associated (e.g., based on data in user data 480) and compares it to the at least one group of users authorized to access the restricted portion of the requested dataset. A user 110A may be affiliated with several authorized access groups and therefore identifying an authorized access group associated with the user 110A may include identifying a set of authorized access groups associated with the user 110A. Furthermore, in order to determine that user 110A is not permitted to access a particular dataset, it must be determined (e.g., based on a comparison) that no authorized access group associated with the user 110A matches one of the at least one authorized access group specified by a data access rule 150.

If the authorized access group associated with the user 110A does not match one of the at least one user group authorized to access the restricted portion of the requested dataset, the database 135 assembles (in the database layer) a modified (e.g., reduced) dataset based on filtering out data that does not comply with the at least one data access rule 150 from the requested dataset and transmits the modified dataset to the application layer, e.g., ABAP application 410, Java application 420 or other applications 430. As noted above, since the rules for data access (e.g., data access rules 150) and the data (e.g., requested dataset) exist in the same layer (e.g., database 135), the processing time to retrieve the dataset from database 135 and transmit it back to the application layer can be reduced. Therefore, with the data access rules 150 being evaluated at the database 135 and only the final results being given back to the application layer, further processing in the application layer is avoided as well as exposure of restricted data in the application layer.

Figure 5:
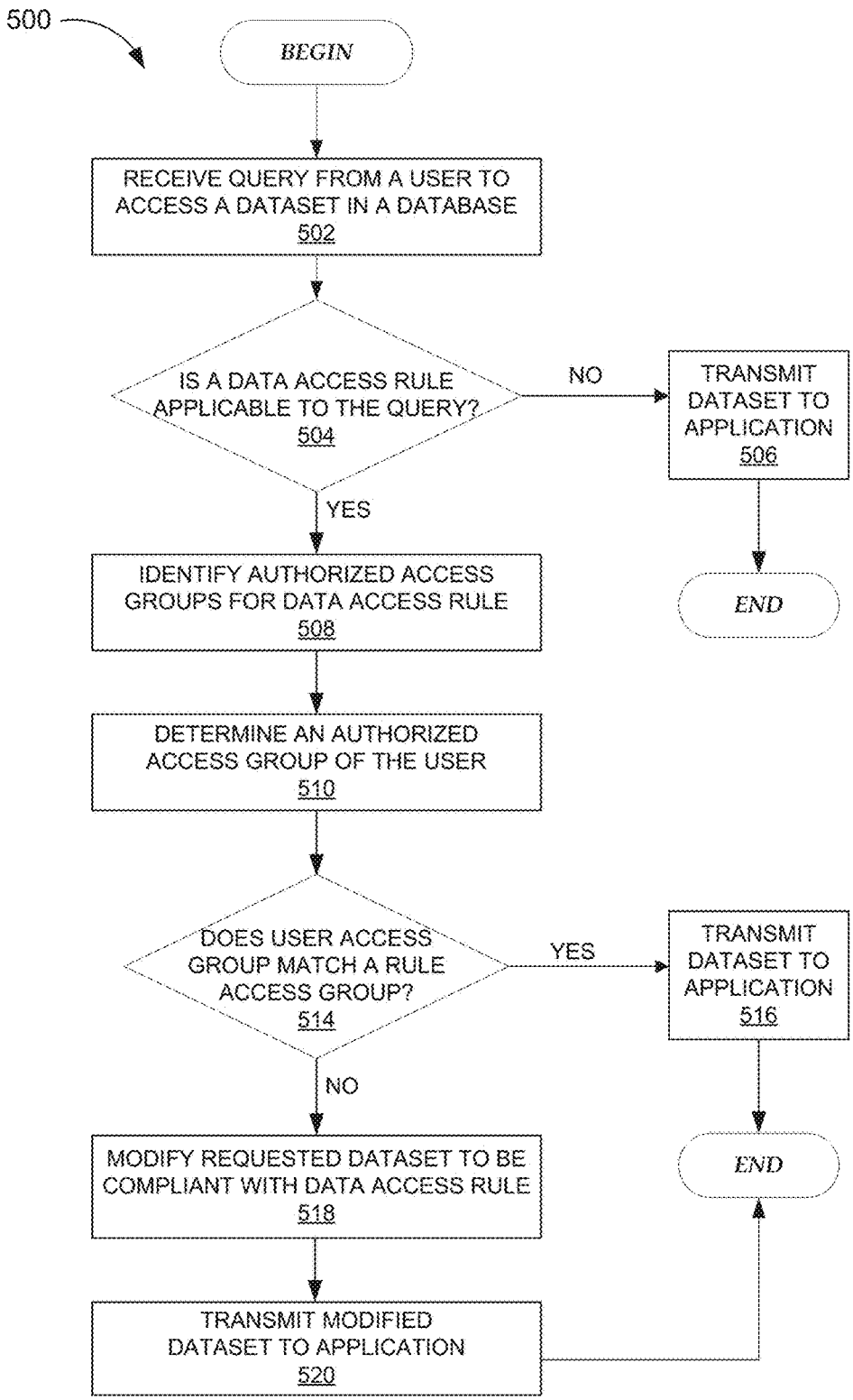
FIG. 5 is a flow diagram of a method, consistent with some embodiments, for processing database queries over a network according to data access rules.

FIG. 5 is a flow diagram of a method 500, consistent with some embodiments, for processing database queries over a network according to data access rules. The method 500 will be described with respect to the system 100 of FIG. 1. At operation 502, the storage 130 receives a query directed to a dataset of database 135 from a user 110A of a client device 120A via a server 140. At operation 504, the system 100 determines whether a data access rule 150 (in database 135) is applicable to the dataset requested by the query from user 110A. If there are no data access rules 150 that are applicable to the dataset requested in the query from user 110A (e.g., based on whether the data access rule 150 describes an access restriction for any portion of the data of the requested dataset) then, at operation 506, the system 100 simply transmits the entire requested dataset from database 135 to client device 120A of user 110A and then the method 500 ends. If there is at least one identified data access rule 150 that is applicable to the requested dataset, then, at operation 508, the system 100 identifies any authorized access groups specified by the at least one data access rule 150 that are permitted to view the otherwise restricted portion of the requested dataset. At operation 510, the system 100 identifies an authorized access group with which the querying user 110A is associated (e.g., based on a user identifier in the query) and compares it to the authorized access groups specified by the at least one data access rule 150 as authorized to access the restricted portion of the requested dataset.

At operation 514, it is determined (e.g., via comparison) whether the authorized access group associated with the user 110A matches one of the at least one authorized access groups specified by the applicable data access rule 150 as authorized to access the restricted portion of the requested dataset. If the authorized access group associated with the user 110A does match one of the at least one authorized access groups specified by the applicable data access rule 150, then, at operation 516, the system 100 simply transmits the entire requested dataset from database 135 to client device 120A of user 110A and then the method 500 ends. If the authorized access group associated with the user 110A does not match one of the at least one authorized access groups specified by the applicable data access rule 150, then, at operation 518, the system 100 assembles (in the database layer) a modified (e.g., reduced) dataset based on filtering out data that does not comply with the at least one data access rule 150 from the requested dataset. At operation 520 the system 100 transmits the modified dataset to the client device 120A of user 110A and then the method 500 ends.

Figure 6:
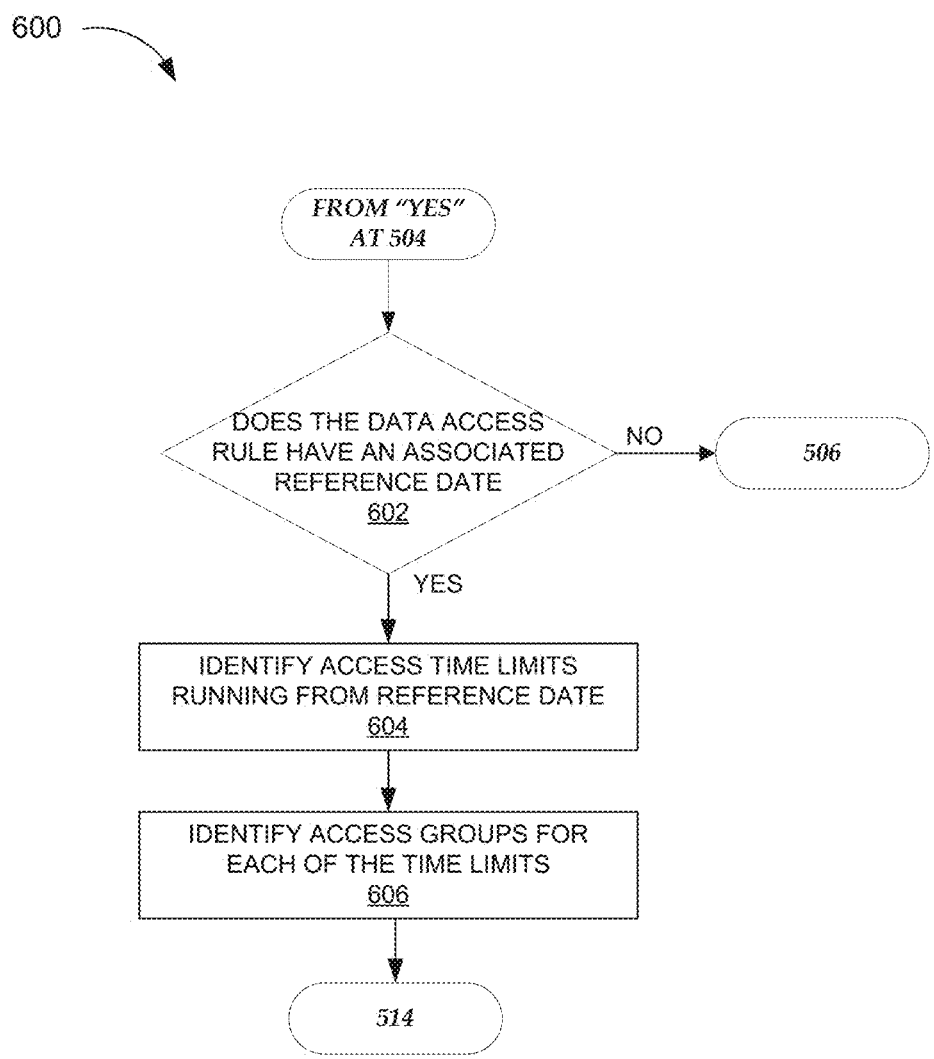
FIG. 6 is a flow diagram of a method, consistent with some embodiments, for processing database queries over a network according to data access rules.

FIG. 6 is a flow diagram of a method 600, consistent with some embodiments, for processing database queries over a network according to data access rules. At operation 602, which continues from the "yes" option at operation 504 of FIG. 5, the system 100 determines whether the at least one data access rule 150 that is applicable to the requested dataset of the query from user 110A has an associated reference date. If the applicable data access rule 150 does not have an associated reference date, then the method 600 returns to operation 506 of FIG. 5. If the applicable data access rule 150 does have an associated reference date, then, at operation 604, the system 100 identifies time limits (measured from the reference date) after which access to a portion of the requested dataset is restricted to certain groups of users, e.g., users not affiliated with a specified authorized access group of the at least one applicable data access rule 150. At operation 606, the system 100 identifies authorized access groups specified by the at least one applicable data access rule 150 for each of the time limits identified at operation 604. The method 600 then returns to operation 514 of FIG. 5.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 7:
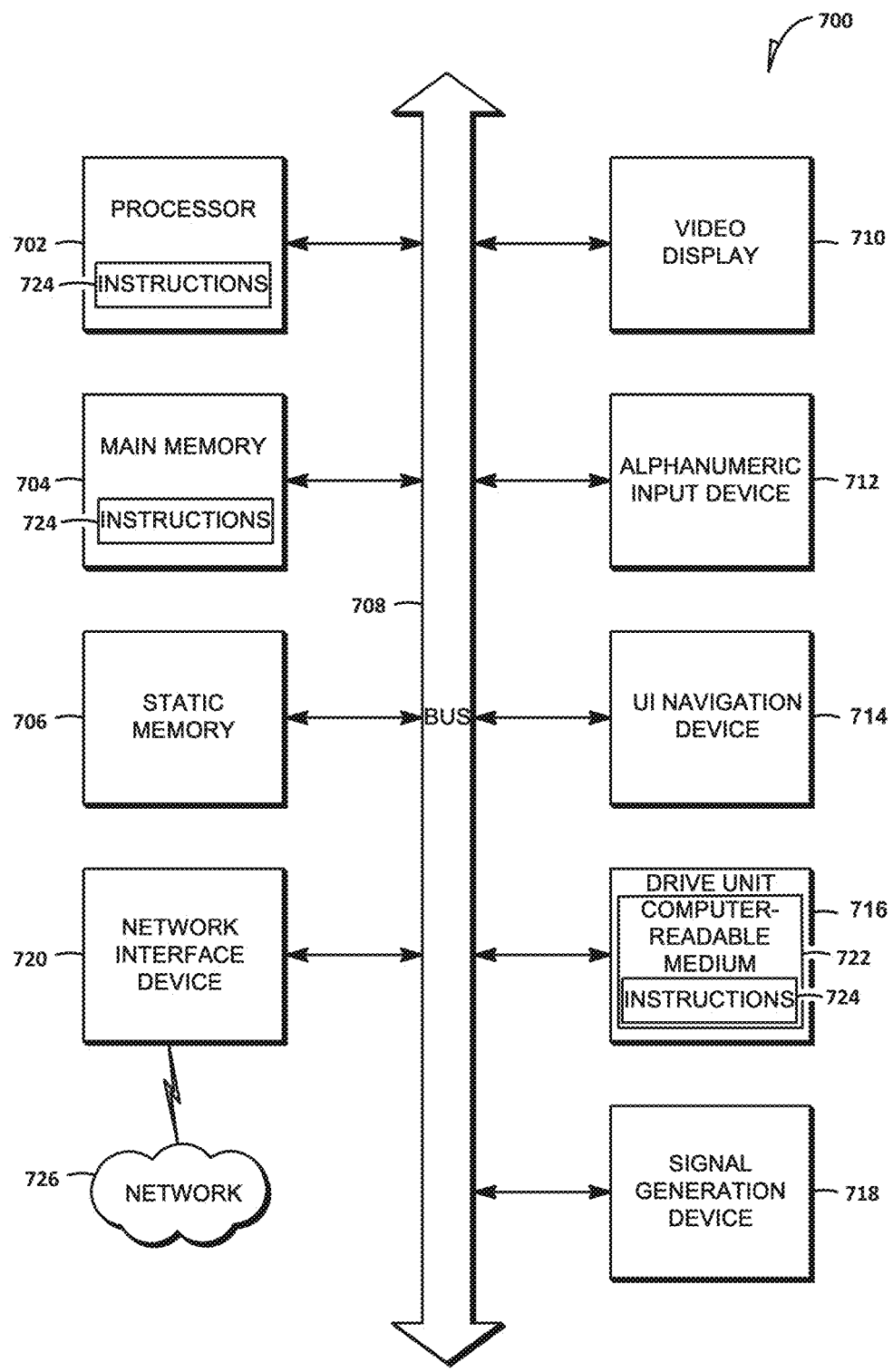
FIG. 7 is a diagrammatic representation of machine, in the example form of a computer system, within which a set of instructions may be executed to cause the machine to perform the methodologies discussed herein.

FIG. 7 is a block diagram of a machine in the example form of a computer system 700 within which instructions 724 for causing the machine to perform any one or more of the methodologies discussed herein can be executed. In alternative embodiments, the machine can operate as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 can further include a video display unit 710 (e.g., a liquid crystal display (LCD) or a cathode ray tube (CRT)). The computer system 700 can also include an alpha-numeric input device 712 (e.g., a keyboard or a touch-sensitive display screen), a user interface (UI) navigation device 714 (e.g., a mouse), a drive unit 716, a signal generation device 718 (e.g., a speaker), and a network interface device 720.

Machine-Readable Medium

The disk drive unit 716 includes a computer-readable medium 722 on which is stored one or more sets of data structures and instructions 724 (e.g., software) embodying or utilized by any one or more of the methodologies or functions described herein. The instructions 724 can also reside, completely or at least partially, within the main memory 704 and/or within the processor 702 during execution thereof by the computer system 700, the main memory 704 and the processor 702 also constituting machine-readable media.

While the computer-readable medium 722 is shown in an example embodiment to be a single medium, the term "machine-readable medium" can include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions (e.g., instructions 724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and other ROM disks.

Transmission Medium

The instructions 724 can further be transmitted or received over a communications network 726 using a transmission medium. The instructions 724 can be transmitted using the network interface device 720 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions (e.g., instructions 724) for execution by the machine, and includes digital or analog communications signals or other media to facilitate communication of software.

Example Mobile Device

Figure 8:
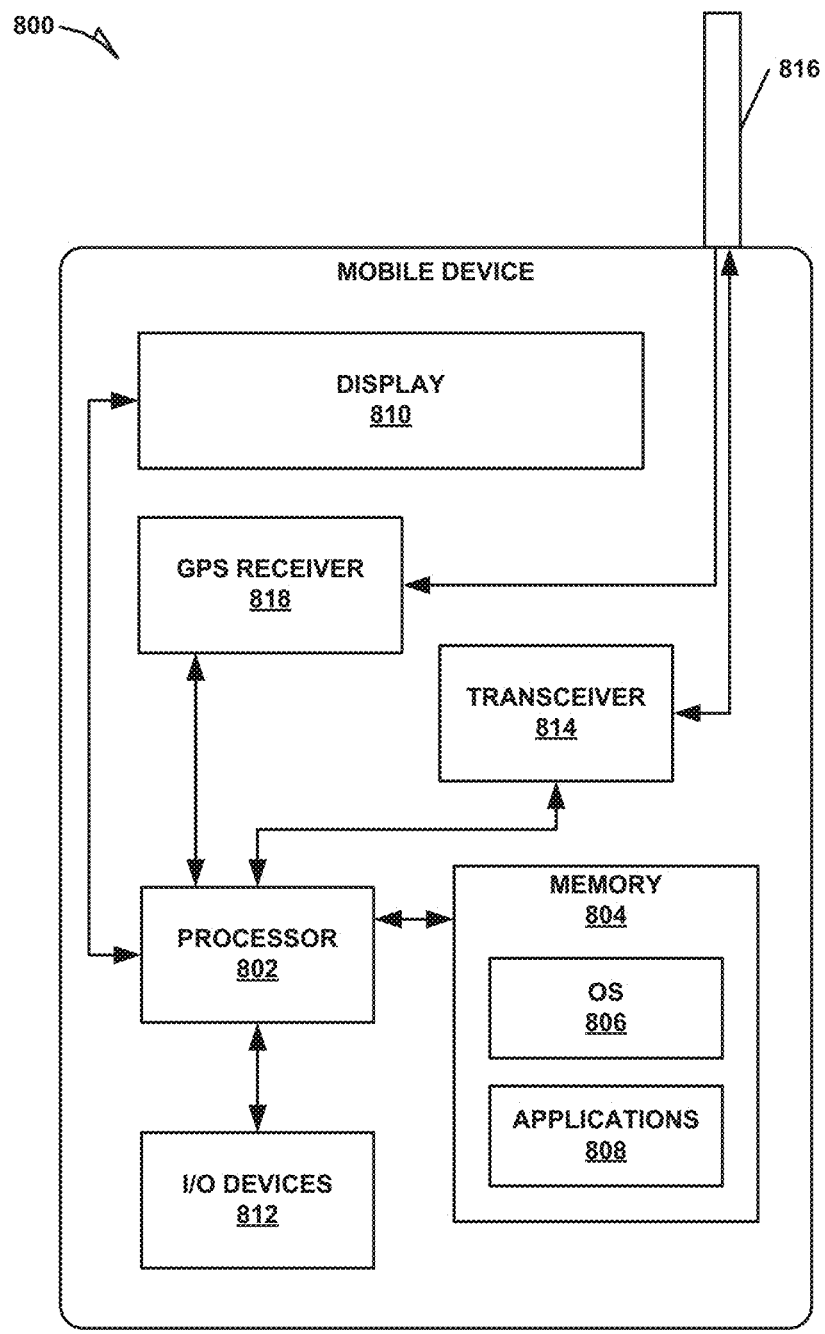
FIG. 8 is a block diagram illustrating a mobile device, according to an example embodiment.

FIG. 8 is a block diagram illustrating a mobile device 800, according to an example embodiment. The mobile device 800 may include a processor 802. The processor 802 may be any of a variety of different types of commercially available processors 802 suitable for mobile devices 800 (for example, an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as applications 808, such as a mobile location-enabled application that may provide location-based services (LBSs) to a user. The processor 802 may be coupled, either directly or via appropriate interphotory hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents.

The invention claimed is:

1. A system comprising:
    at least one database comprising a plurality of datasets and data access rules for accessing the plurality of datasets;
    a memory that stores instructions; and
    one or more hardware processors configured by the instructions to perform operations comprising:
    receiving, at a database layer of the database, a query from an application running on a client device to access a dataset from the database, the query associated with a user;
    identifying, by the database layer of the database, at least one data access rule that is applicable to the dataset, the at least one data access rule specifying at least a first authorized access group and at least a second authorized access group;
    identifying, by the database layer of the database, an authorized access group associated with the user;
    comparing, by the database layer of the database, the authorized access group associated with the user with each of the at least first authorized access group and the at least second authorized access group specified in the at least one data access rule;
    determining by the database layer of the database, that the authorized access group associated with the user matches the at least first authorized access group;
    determining, by the database layer of the database, that the at least one data access rule has an associated reference date;
    identifying, by the database layer of the database, a time limit specified by the at least one access rule for the first authorized access group, the time limit measured from the reference date and after which access to a portion of the requested dataset is restricted to the first authorized access group;
    determining, by the database layer of the database, whether the query to access the dataset is received within the time limit specified for the first authorized access group;
    based on determining that the query to access the dataset is received within the time limit specified for the first authorized access group, assembling the requested dataset of the query and transmitting the requested dataset to the application; and
    based on determining that the query to access the dataset is received after the time limit specified for the first authorized access group,
    assembling, by the database layer of the database, a modified dataset by filtering out data from the requested dataset of the query that does not comply with the at least one data access rule based on the time limit specified for the first authorized access group, and transmitting the modified dataset to the application.

2. The system of claim 1, wherein:
    the at least one data access rule is applicable to the dataset based on the at least one data access rule describing a restriction on accessing a portion of data of the dataset; and
    assembling the modified dataset comprises assembling the data of the dataset without the restricted portion of the data of the dataset.

3. The system of claim 2, wherein:
    the restriction on accessing a portion of the data is based on the reference date associated with the restricted portion of the data of the dataset.

4. The system of claim 3, wherein the restriction on accessing a portion of the data is further based on a company code or a document type associated with the restricted portion of the data of the dataset.

5. The system of claim 1, wherein:
    the at least one database access rule comprises a table in the database; and
    the at least one database comprises a relational database and the query is a relational SQL query or the at least one database comprises an XML repository and the query is an XML query.

6. The system of claim 1, wherein the at least one access rule specifies one or more conditions for accessing restricted data.

7. The system of claim 6, wherein identifying the at least one access rule that is applicable to the dataset comprises determining that the requested dataset meets the specified one or more conditions for accessing restricted data.

8. The system of claim 1, wherein the at least one access rule specifies end durations for each of a plurality of authorized access groups specified by the by the at least one access rule.

9. The system of claim 8, wherein identifying the time limit specified by the at least one access rule for the first authorized access group comprises calculating the time limit based on the reference data and a specified end duration for the first authorized access group.

10. The system of claim 1, wherein the at least one access rule further specifies a time limit for the second authorized access group, the time limit measured from the reference date and after which access to a portion of the requested dataset is restricted to the second authorized access group.

11. The system of claim 1, wherein the time limit for the second authorized access group is different than the time limit for the first authorized access group.

12. A method comprising:
    receiving, at a database layer of a database in a system, a query from an application running on a client device to access a dataset from at least one database, the query associated with a user;
    identifying, by the database layer of the database, at least one data access rule that is applicable to the dataset, the at least one data access rule specifying at least a first authorized access group and at least a second authorized access group;

identifying, by the database layer of the database, an authorized access group associated with the user;

comparing, by the database layer of the database, the authorized access group associated with the user with each of the at least first authorized access group and the at least second authorized access group specified in the at least one data access rule;

determining, by the database layer of the database, that the authorized access group associated with the user matches the at least first authorized access group;

determining, by the database layer of the database, that the at least one data access rule has an associated reference date;

identifying; by the database layer of the database, a time limit specified by the at least one access rule for the first authorized access group, the time limit measured from the reference date and after which access to a portion of the requested dataset is restricted to the first authorized access group;

determining, by the database layer of the database, whether the query to access the dataset is received within the time limit specified for the first authorized access group;

based on determining that the query to access the dataset is received within the time limit specified for the first authorized access group, assembling the requested dataset of the query and transmitting the requested dataset to the application; and based on determining that the query to access the dataset is received after the e limit specified for the first authorized access group, assembling, by the database layer of the database, a modified dataset by filtering out data from the requested dataset of the query that does not comply with the at least one data access rule based on the time limit specified for the first authorized access group, and transmitting the modified dataset to the application.

13. The method of claim 12, wherein:
identifying an authorized access group associated with the user comprises identifying multiple authorized access groups associated with the user; and
comparing the authorized access group associated with the user with each of the at least first authorized access group and at least second authorized access group comprises a comparison between each of the multiple authorized access groups associated with the user and each of the at least first authorized access group and at least second authorized access group.

14. The method of claim 12, wherein: the at least one data access rule is applicable to the dataset based on the at least one data access rule describing a restriction on accessing a portion of data of the dataset; and the restriction on accessing a portion of the data is based on the reference date associated with the restricted portion of the data of the dataset.

15. The method of claim 14, wherein the restriction on accessing a portion of the data is further based on a company code or a document type associated with the restricted portion of the data of the dataset.

16. The method of claim 12, wherein:
the at least one database access rule comprises a table in the database; and
the at least one database comprises a relational database and the query is a relational SQL query or the at least one database comprises an XML repository and the query is an XML query.

17. A non-transitory machine-readable storage medium storing instructions which, when executed by one or more hardware processors of a machine, cause the machine to perform operations comprising:

receiving, at a database layer of a database, a query from an application running on a client device to access a dataset from at least one database, the query associated with a user;

identifying, by the database layer of the database, at least one data access rule that is applicable to the dataset, the at least one data access rule specifying at least a first authorized access group and at least a second authorized access group;

identifying, by the database layer of the database, an authorized access group associated with the user;

comparing, by the database layer of the database the authorized access group associated with the user with each of the at least first authorized access group and the at least second authorized access group specified in the at least one data access rule;

determining, by the database layer of the database, that the authorized access group associated with the user matches the at least first authorized access group;

determining, by the database layer of the database, that the at least one data access rule has an associated reference date;

identifying, by the database layer of the database, a time limit specified by the at least one access rule for the first authorized access group, the time limit measured from the reference date and, after which access to a portion of the requested dataset is restricted to the first authorized access group;

determining by the database layer of the database, whether the query to access the dataset is received within the time limit specified for the first authorized access group;

based on determining that the query to access the dataset is received within the time limit specified for the first authorized access group, assembling the requested dataset of the query and transmitting the requested dataset to the application; and based on determining that the query to access the dataset is received after the time limit specified for the first authorized access group,
assembling, by the database layer of the database, a modified dataset by filtering out data from the requested dataset of the query that does not comply with the at least one data access rule based on the time limit specified for the first authorized access group, and transmitting the modified dataset to the application.

18. The machine-readable storage medium of claim 17, wherein:
identifying an authorized access group associated with the user comprises identifying multiple authorized access groups associated with the user; and
comparing the authorized access group associated with the user with each of the at least first authorized access group and at least second authorized access group comprises a comparison between each of the multiple authorized access groups associated with the user and each of the at least first authorized access group and at least second authorized access group.

19. The machine-readable storage medium of claim 17, wherein:
the at least one data access rule is applicable to the dataset based on the at least one data access rule describing a restriction on accessing a portion of data of the dataset; and the restriction on accessing a portion of the data is based on the reference date associated with the restricted portion of the data of the dataset.

20. The machine-readable storage medium of claim 19, wherein the restriction on accessing a portion of the data is further based on a company code or a document type associated with the restricted portion of the data of the dataset.

\* \* \* \* \*